(12) United States Patent
Wagener et al.

(10) Patent No.: US 11,808,647 B2
(45) Date of Patent: Nov. 7, 2023

(54) FIELD DEVICE ASSEMBLY INCLUDING IMPROVED DIELECTRIC INSULATION SYSTEM

(71) Applicant: Rosemount Inc., Shakopee, MN (US)

(72) Inventors: Andrew John Wagener, Maple Grove, MN (US); Jacob Daniel Holm, Savage, MN (US); Sydney Jane Jones, St. Louis Park, MN (US)

(73) Assignee: ROSEMOUNT INC., Shakopee, MN (US)

( * ) Notice: Subject to any disclaimer, the term of this patent is extended or adjusted under 35 U.S.C. 154(b) by 62 days.

(21) Appl. No.: 17/486,141

(22) Filed: Sep. 27, 2021

(65) Prior Publication Data

US 2023/0096421 A1  Mar. 30, 2023

(51) Int. Cl.
| | | |
|---|---|---|
| *G01L 19/00* | (2006.01) | |
| *F16L 23/16* | (2006.01) | |
| *H01B 17/56* | (2006.01) | |

(52) U.S. Cl.
CPC ........ *G01L 19/0007* (2013.01); *F16L 23/162* (2013.01); *H01B 17/56* (2013.01)

(58) Field of Classification Search
None
See application file for complete search history.

(56) References Cited

U.S. PATENT DOCUMENTS

| | | |
|---|---|---|
| 4,776,600 A | 10/1988 | Kohn |
| 5,292,155 A | 3/1994 | Bell et al. |
| 5,316,320 A | 5/1994 | Breaker |
| 6,059,254 A | 5/2000 | Sundet et al. |
| 6,402,159 B1 | 6/2002 | Kohn |

(Continued)

FOREIGN PATENT DOCUMENTS

| | | | |
|---|---|---|---|
| CN | 101709812 | * | 1/2012 |
| CN | 101709812 B | | 1/2012 |

(Continued)

OTHER PUBLICATIONS

Communication from EP Application No. 17932522.8, dated Feb. 4, 2022.
Notification of Transmittal of International Search Report and the Written Opinion of the International Searching Authority from International Application No. PCT/US2022/028949, dated Aug. 5, 2022.

(Continued)

*Primary Examiner* — Brandi N Hopkins
*Assistant Examiner* — Nigel H Plumb
(74) *Attorney, Agent, or Firm* — Westman, Champlin & Koehler, P.A.

(57) ABSTRACT

An industrial process field device includes a pressure sensor, and a housing containing the pressure sensor. The housing includes a base having a base interface and a first base process opening. A flange is attached to the base and includes a flange interface having a first flange process opening. A first gasket process opening of a gasket is aligned with the first base process opening and the first flange process opening. A first surface of the gasket engages the base interface, and a second surface of the gasket engages the flange interface. A dielectric insulation system includes at least one dielectric layer that insulates the housing from electrical currents conducted through the flange. Each dielectric layer includes a layer of ceramic material, an anodized layer, or a plastic overmold, which improve a maximum working pressure of the field device.

21 Claims, 12 Drawing Sheets

(56) References Cited

U.S. PATENT DOCUMENTS

| | | | |
|---|---|---|---|
| 7,080,558 | B2 | 7/2006 | Broden et al. |
| 8,132,464 | B2 | 3/2012 | Broden et al. |
| 9,642,273 | B2 | 5/2017 | Norman et al. |
| 10,816,428 | B2 | 10/2020 | Wagener |
| 2005/0087020 | A1 | 4/2005 | Ueyanagi et al. |
| 2011/0266755 | A1 | 11/2011 | Anderson et al. |
| 2012/0006119 | A1 | 1/2012 | Broden et al. |
| 2015/0085449 | A1 | 3/2015 | Norman et al. |
| 2015/0090039 | A1 | 4/2015 | Broden et al. |
| 2017/0130843 | A1* | 5/2017 | Singh ............ E21B 17/003 |
| 2018/0094756 | A1* | 4/2018 | Brown ............ F16L 25/026 |
| 2018/0299044 | A1 | 10/2018 | Brown et al. |
| 2019/0391030 | A1* | 12/2019 | Wagener ............ G01L 19/0038 |

FOREIGN PATENT DOCUMENTS

| | | | |
|---|---|---|---|
| CN | 102331324 | | 1/2012 |
| CN | 104470271 | | 3/2015 |
| CN | 213271488 | * | 5/2021 |
| CN | 213271488 U | | 5/2021 |

OTHER PUBLICATIONS

Office Action from Chinese Patent Application No. 201821587692.4 dated Mar. 25, 2019.

Office Action from Chinese Patent Application No. 201811136789.8, dated Aug. 4, 2020.

Notification of Transmittal of International Search Report and the Written Opinion of the International Searching Authority from International Application No. PCT/US2019/035511, dated Sep. 4, 2019.

"Instrumentation Products Schneider DirectMount Systems", Jan. 2017, pp. 1-20.

Brochure by Advance Products & Systems, LLC, entitled "Flange Isolating Gasket Kits", Rev. Aug. 17, 2017, 8 pgs.

Communication from European Patent Application No. 19732522.8, dated Nov. 13, 2020.

Office Action from Japanese Patent Application No. 2020-569980, dated Oct. 19, 2021.

Office Action from U.S. Appl. No. 16/015,924, dated Mar. 30, 2020.

* cited by examiner

FIELD DEVICE ASSEMBLY INCLUDING IMPROVED DIELECTRIC INSULATION SYSTEM

BACKGROUND

Embodiments of the present disclosure relate to industrial process control systems for industrial plants. More specifically, embodiments of the present disclosure relate to providing dielectric insulation to an industrial process field device to protect electronics of a field device from electric currents of cathodic protection schemes conducted through a process interface, for example.

In industrial settings, control systems are used to monitor and control inventories of industrial and chemical processes, and the like. Typically, the control system performs these functions using industrial process field devices distributed at key locations in the industrial process and coupled to the control circuitry in the control system by a process control loop. The term "field device" refers to any device that performs a function in a distributed control or process monitoring system, including all devices currently known, or yet to be known, that are used in the measurement, control, and/or monitoring of industrial processes.

Typical field devices include device circuitry that enables the field device to perform conventional field device tasks such as process parameter monitoring and measurements using one or more sensors, and/or process control operations using one or more control devices. Exemplary sensors include pressure sensors, level sensors, temperature sensors, and other sensors used in industrial processes. Exemplary control devices include actuators, solenoids, valves, and other control devices.

The device circuitry of field devices may also include a controller that is used to control the sensors and/or control devices, and communicate with a process control system or other circuitry, over a process control loop, such as a 4-20 mA process control loop, for example. In some installations, the process control loop is used to deliver a regulated current and/or voltage to the field device for powering the field device. The process control loop can also carry data, such as a process parameter value corresponding to a sensed process parameter. This data may be communicated over the process control loop as an analog signal, or as a digital signal.

Cathodic protection is a technique used in many industrial applications to protect metallic structures, such as pipes and tanks, from corrosion, by making the structure the cathodic side of an electrochemical cell. For example, large pipeline structures may use an impressed current cathodic protection system, in which the structure is connected to a DC power source. When such a cathodic protection scheme is implemented on a structure, it is necessary to electrically insulate field devices coupled to the structure from the scheme to protect the electronics of the field devices.

SUMMARY

Embodiments of the present disclosure include field device assemblies that include a dielectric insulation system, and dielectric insulation systems for use in industrial process field device assemblies. One embodiment of the field device assembly includes an industrial process field device, which includes a pressure sensor, and a housing containing the pressure sensor. The housing includes a base having a base interface and a first base process opening. A flange is attached to the base and includes a flange interface having a first flange process opening. A pressure at the first flange process opening is communicated to the pressure sensor through the first base process opening. A first gasket process opening of a gasket is aligned with the first base process opening and the first flange process opening. The gasket includes a first surface that engages the base interface, and a second surface that is opposite the first surface and engages the flange interface. A dielectric insulation system including at least one dielectric layer insulates the housing from electrical currents conducted through the flange. Each of the at least one dielectric layer includes a layer of ceramic material, an anodized layer, or a plastic overmold.

One embodiment of the dielectric insulation system includes a gasket having a metal body and a dielectric layer. The dielectric layer includes a ceramic coating on an exterior surface of the metal body, or an anodized exterior surface of the metal body.

Another embodiment of the dielectric insulation system includes a bolt spacer having a sleeve portion, a shoulder portion attached to an end of the sleeve portion, and a dielectric layer. The shoulder portion has a diameter that is larger than an exterior diameter of the sleeve portion. The dielectric layer includes: a ceramic body, which forms the sleeve portion and the shoulder portion; a ceramic material overmolded with a plastic material, which forms the shoulder portion; a metal body having an anodized exterior surface, wherein the metal body forms the sleeve portion and the shoulder portion; or a metal body having a ceramic coating on an exterior surface of the metal body, wherein the metal body forms the sleeve portion and the shoulder portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
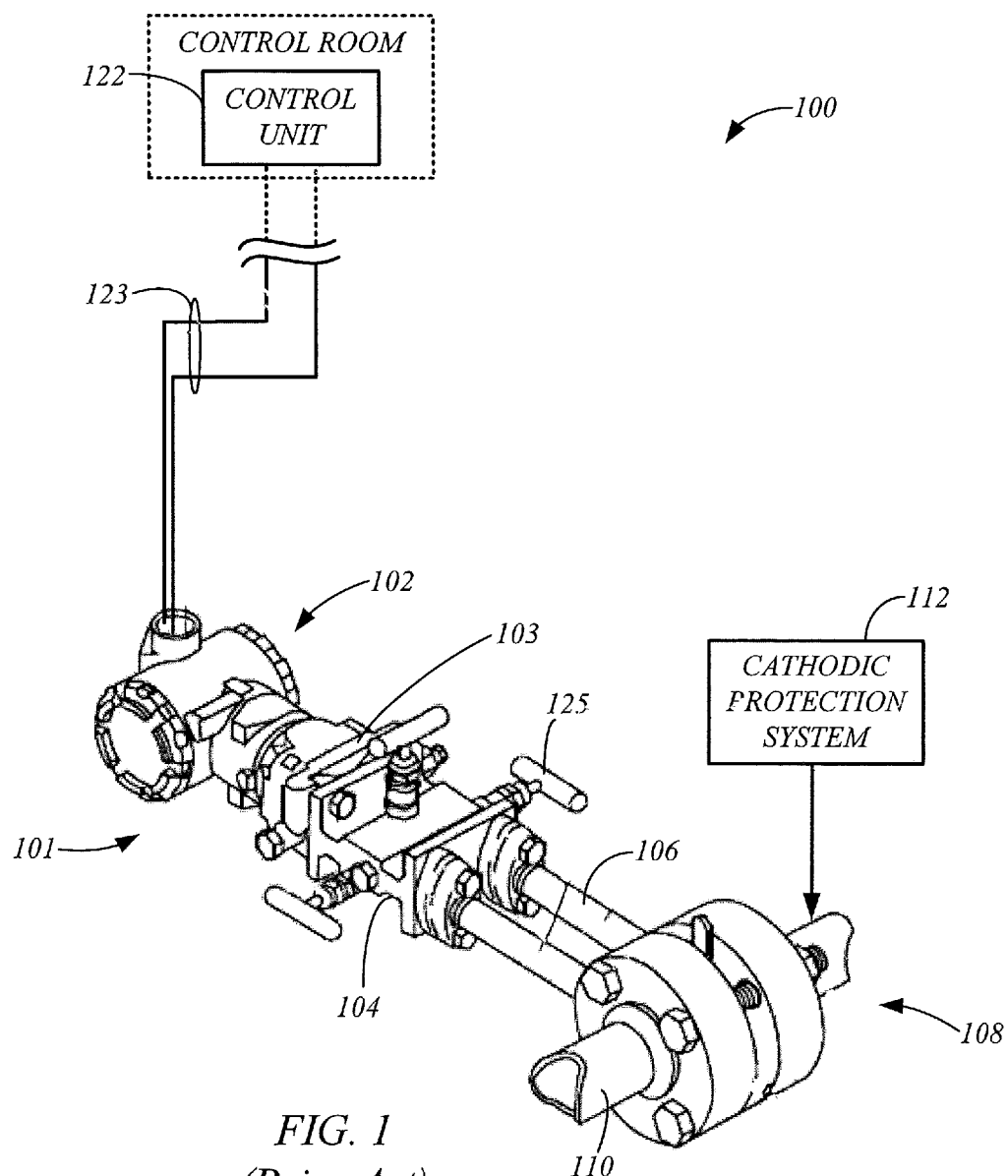
FIG. 1 is a simplified diagram of an example of an industrial process control system, in accordance with the prior art.

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified diagram of exemplary industrial process measurement or control system 100, in accordance with the prior art. The system 100 is used in the processing of a material to transform the material from a less valuable state into more valuable and useful products, such as petroleum, chemicals, paper, food, etc. For example, an oil refinery performs industrial processes that can process crude oil into gasoline, fuel oil, and other petrochemicals.

The system 100 includes a field device assembly 101, which includes an industrial process field device 102, a transmitter flange or adapter 103, a manifold 104, and/or a process interface 106 that connects the manifold 104 and the field device 102 to an industrial process 108. In some embodiments, the process 108 involves a process material, such as a fluid (i.e., liquid or gas), that is contained or transported through a process vessel 110, such as a pipe, a tank, or another process vessel.

A cathodic protection system 112 may be used to provide corrosion protection for the pipe 110, or other structure to which the field device 102 is attached, such as a tank. The cathodic protection system 112 may take on any suitable form, such as an impressed current cathodic protection system or a galvanic cathodic protection system, for example.

Figure 2:
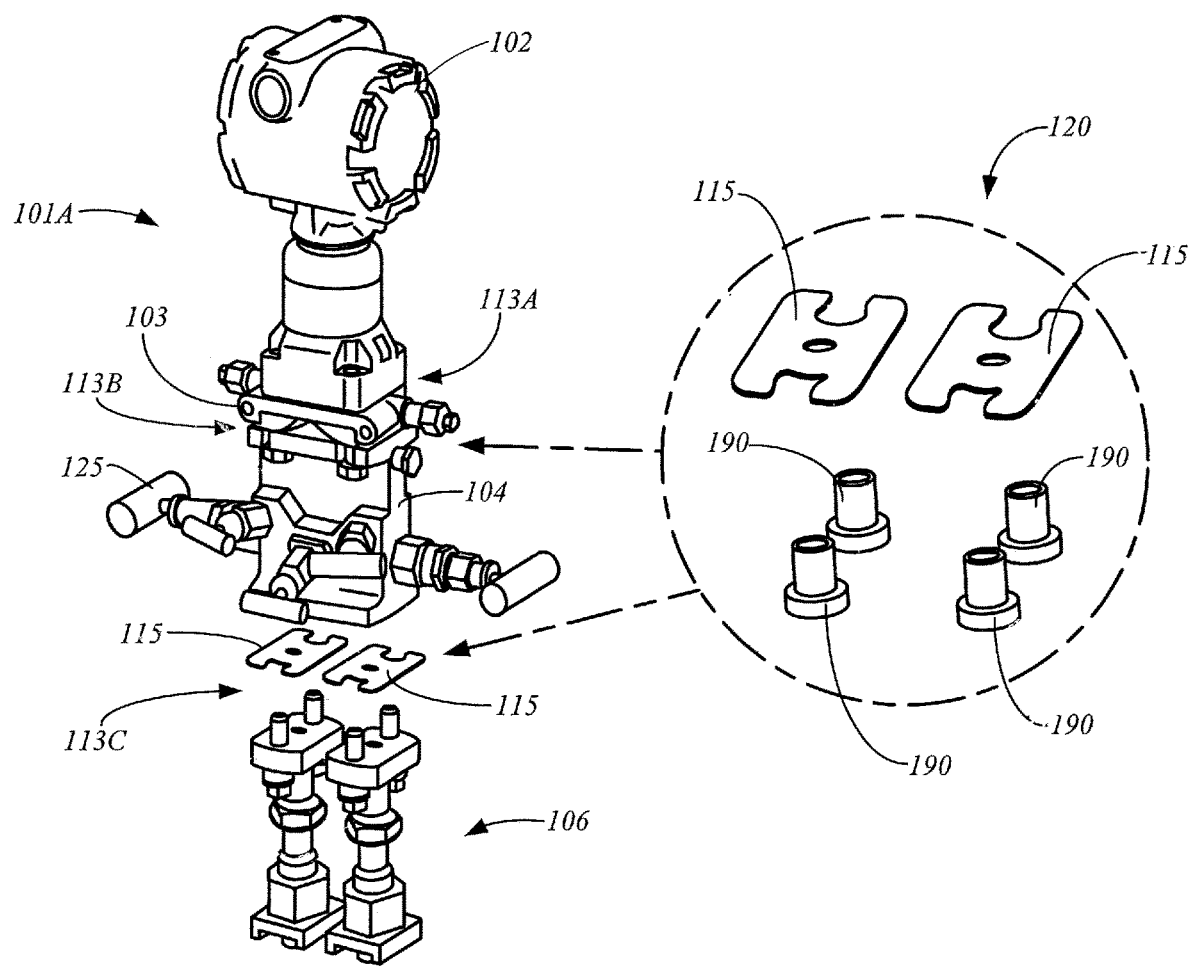
FIG. 2 is an isometric view of an example of a field device assembly exploded from a process interface, in accordance with embodiments of the present disclosure.
Figure 3:
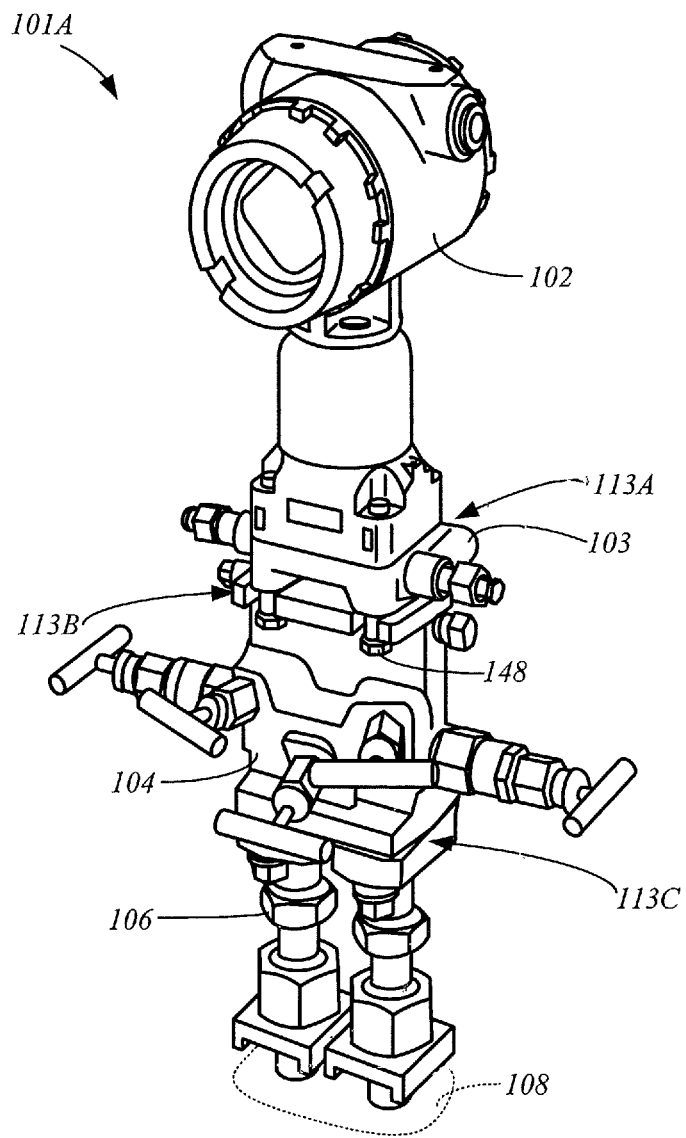
FIG. 3 is an isometric view of the field device assembly of FIG. 2 mounted to a process interface, in accordance with embodiments of the present disclosure.

FIG. 2 is an isometric view of an example of a field device assembly 101A exploded from a process interface 106, and FIG. 3 is an isometric view of the assembly 101A of FIG. 2 mounted to the process interface 106, in accordance with embodiments of the present disclosure. Here, the field device 102 of the assembly 101A may be mounted to the adapter 103, which is mounted to the manifold 104, which is mounted to the process interface 106. The adapter 103 generally adapts the fluid paths of the field device 102 to the fluid paths of the manifold 104. The assembly 101A may be sealed and electrically isolated from the cathodic protection system 112 at the junction or interface 113A between the field device 102 and the adapter 103, the junction 113B between the adapter 103 and the manifold 104, and the junction 113C between the manifold 104 and the process interface 106, using conventional techniques and/or techniques described herein. The assembly 101A requires the sealing of four potential leak paths. Three of the leak paths are located at the interfaces or junctions 113A-C, and one of the leak paths is located at the junction between the process interface 106 with the process 108.

Figure 4:
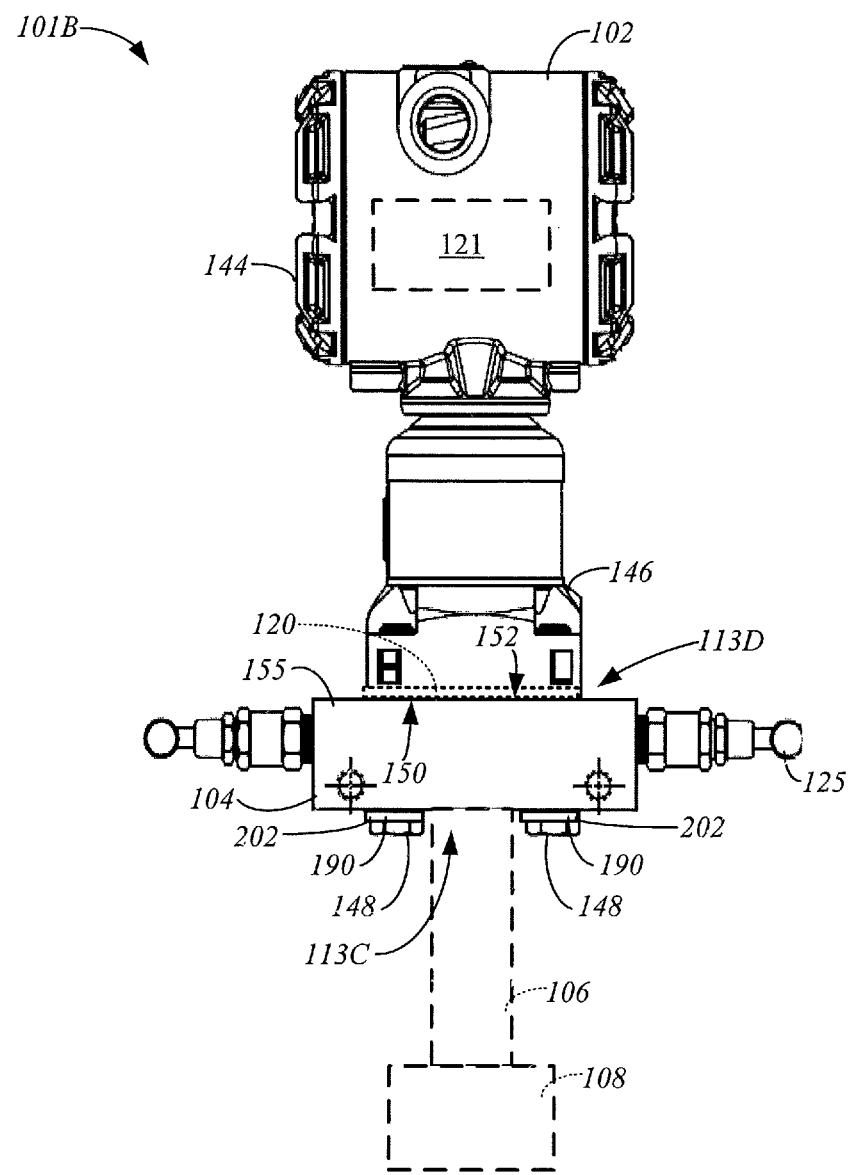
FIG. 4 is a side view of an example of a field device assembly, in accordance with embodiments of the present disclosure.
Figure 5:
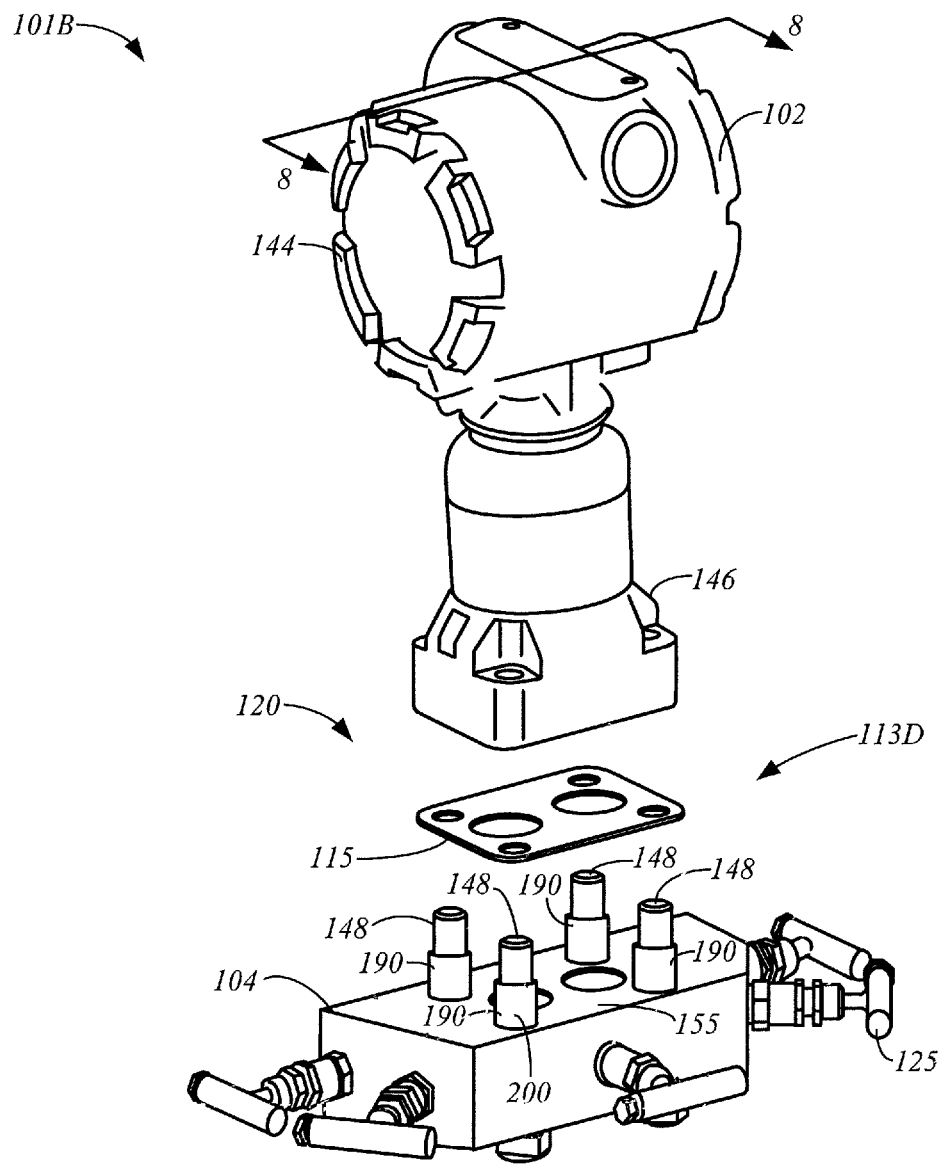
FIG. 5 is an exploded isometric view of the field device assembly of FIG. 4, in accordance with embodiments of the present disclosure.

Alternatively, a field device assembly 101B may comprise the field device 102 that is mounted directly to the manifold 104, as illustrated in the side view of FIG. 4 and the exploded isometric view of FIG. 5. FIG. 4 also schematically illustrates the attachment of the field device assembly 101B to a process interface 106 and the process 108, which are shown in phantom lines. This embodiment of the field device assembly 101 reduces the number of potential leak paths to three. For example, the assembly 101B includes the leak path between the process interface 106 and the process 108, and the leak path 113C between the manifold 104 and the process interface 106, but replaces the two leak paths 113A and 113B associated with the adapter 103, with a single leak path 113D between the manifold 104 and the field device 102. Accordingly, the field device assembly 101B may be preferred over the assembly 101A.

It is understood that embodiments of the present disclosure may be applicable to the field device assemblies 101A and 101B, which may generally be referred to as field device assembly 101, as well as other field device assembly configurations.

Figure 6:
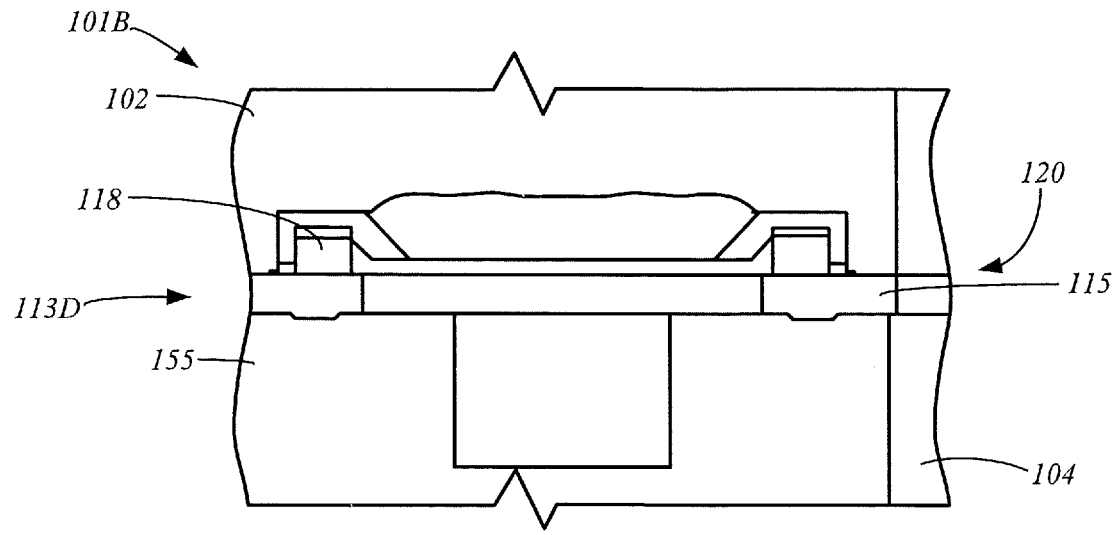
FIG. 6 is a simplified cross-sectional view of a portion of the field device assembly of FIG. 4, in accordance with embodiments of the present disclosure.

The field device assemblies 101, may include a gasket 115 at one or more of the interfaces 113 indicated above that are potential leak paths, which are shown in FIGS. 2 and 5. Each of the gaskets 115 operates to seal fluid paths through the interfaces 113 between the components of the assemblies 101. Additionally, the seals formed at the interfaces 113 of the assemblies 101 may include an O-ring and other components to provide the desired sealing, if necessary. For example, an O-ring 118 may form a seal between the field device 102 and the gasket 113 at the interface 113D of the assembly 101B, as indicated FIG. 6, which is a partial cross-sectional view of the field device assembly 101B at the interface 113D, in accordance with embodiments of the present disclosure.

In some embodiments, the field device assemblies 101A and 101B each include a dielectric insulation system 120 (phantom lines), such as indicated in FIGS. 2 and 4, formed in accordance with one or more embodiments of the present disclosure. The system 120 operates to protect the electronics 121 (FIG. 4) of the field device 102 from electrical charges and currents that may be conducted through the process interface 106 and other components of the assemblies 101, such as those produced by cathodic protection schemes implemented by the system 112 (FIG. 1), for example.

The system 120 generally includes one or more dielectric layers, such as, for example, at the interface 113A between the field device 102 and the adapter 103 of the field device 101A (FIG. 3), or at the interface 113D between the field device 102 and the manifold 104 of the assembly 101B (FIG. 4), that insulate the field device 102 or electronics of the field device 102 from electrical charges or currents conducted through the process interface 106. Those skilled in the art understand that the one or more dielectric layers of the system 120 may be located at other interfaces of the field assemblies 101A or 101B, while providing the desired electrical insulation, such as the interface 113B and/or 113C (FIG. 2), for example. Accordingly, while examples of embodiments of the system 120 may be described with reference to the interface 113D between the manifold 104 and the field device 102 of the assembly 101B, it is understood that the disclosed embodiments also relate to other interfaces 113 of the assembly 101B, as well as the interfaces 113 of the assembly 101A. Accordingly, embodiments that are described as relating to the interface 113D may also apply to these other interfaces.

Figure 7:
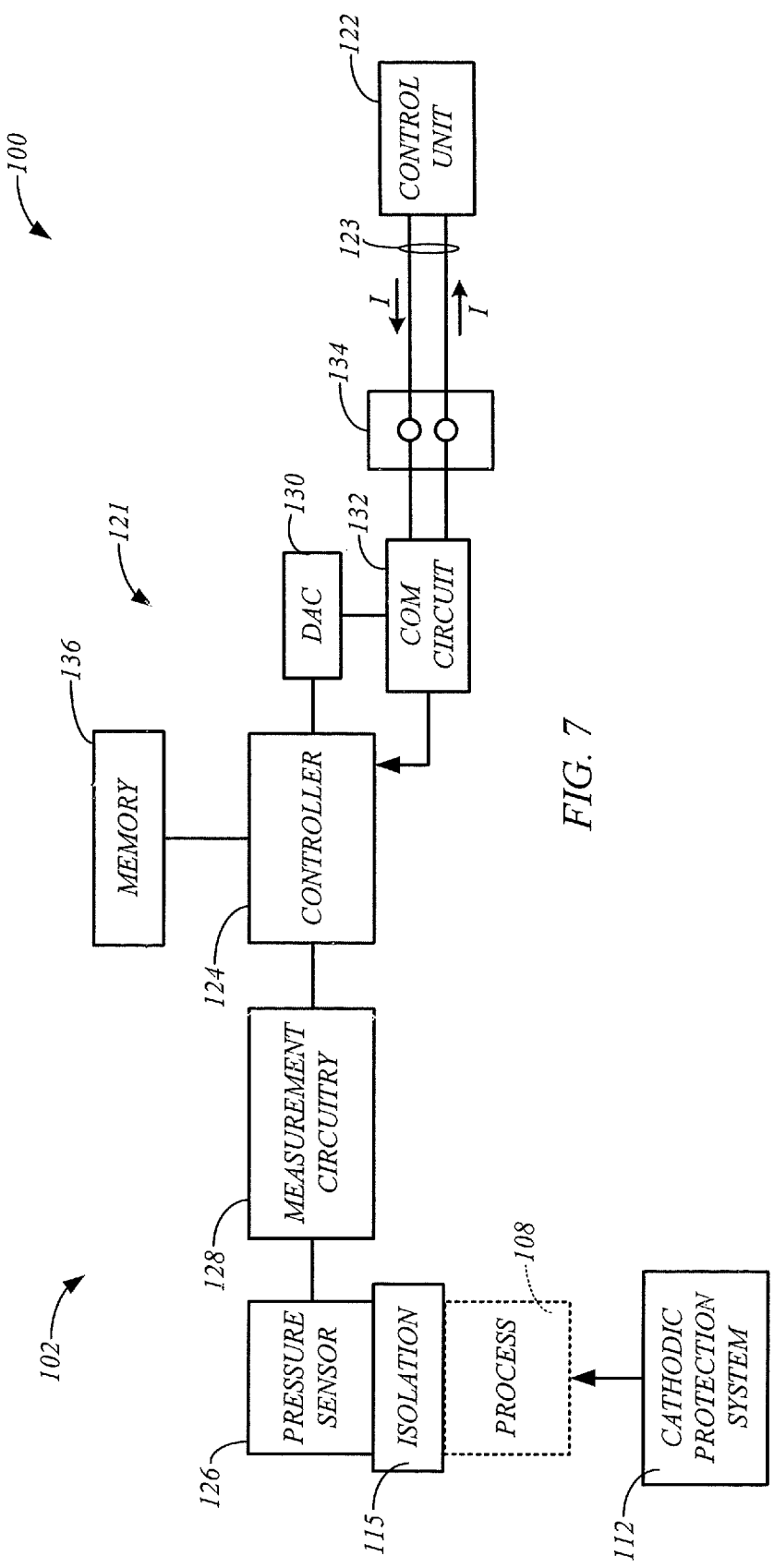
FIG. 7 is a simplified block diagram of an example of a field device in the form of a pressure transmitter, in accordance with embodiments of the present disclosure.

Before describing embodiments of the system 120 in detail, features of the field device 102 will be described with reference to FIG. 1 and FIG. 7, which is a simplified block diagram of an exemplary field device 102 in the form of a pressure transmitter, in accordance with embodiments of the present disclosure.

The field device 102 may communicate with a computerized control unit 122, which may be configured to control the field device 102. The control unit 122 may be remotely located from the field device 102, such as in a control room for the system 100, as shown in FIG. 1. The control unit 122 may be communicatively coupled to the field device 102 over a suitable physical communication link, such as a two-wire control loop 123, or a wireless communication link.

Communications between the control unit 122 and the field device 102 may be performed over the control loop 123 in accordance with conventional analog and/or digital communication protocols. In some embodiments, the process control loop 123 includes a 4-20 milliamp process control loop, in which a process variable may be represented by a level of a loop current I (FIG. 7) flowing through the process control loop 123. Exemplary digital communication protocols include the modulation of digital signals onto the analog current level of the two-wire process control loop 123, such as in accordance with the HART® communication standard. Other purely digital techniques may also be employed including FieldBus and Profibus communication protocols. Wireless protocols, such as IEC 62591, may also be employed.

In some embodiments, the field device 102 is in the form of a pressure transmitter that is configured to sense a single pressure or a differential pressure of the process 108. The field device includes a controller 124, one or more pressure sensors 126, measurement circuitry 128, a digital-to-analog converter (DAC) 130, a communications circuit 132, and/or a terminal block 134, as shown in FIG. 7.

The controller 124 may represent one or more processors (i.e., microprocessor, central processing unit, etc.) that control components of the field device 102 to perform one or more functions described herein in response to the execution of instructions, which may be stored locally in non-transitory computer readable media or memory 136 of the device 102. In some embodiments, the processors of the controller 124 are components of one or more computer-based systems. The controller 124 may include one or more control circuits, microprocessor-based engine control systems, one or more programmable hardware components, such as a field programmable gate array (FPGA), that are used to control components of the device 102 to perform one or more functions described herein. The controller 124 may also represent other conventional field device circuitry.

Valving 125 of the manifold 104 may be adjusted to expose the field device 102 to the process 108, such as through the process interface 106, in accordance with conventional manifolds 104. This allows the field device 102 to sense or measure a pressure or a differential pressure of the process 108 using one or more pressure sensors represented by block 126 in FIG. 7.

The measurement circuity 128 represents circuitry that interacts with the sensor 126. For instance, the circuitry 128 may include circuitry that translates an output from the sensor 126 for use by a controller 124 of the field device 102.

The DAC 130 may be used by the controller 124 to convert digital signals into analog signals that are communicated to the control unit 122 using the communications circuit 132, such as over the two-wire process control loop 123 by adjusting the loop current I to indicate a value of a process parameter sensed by the sensor 126, for example. The controller 124 may also receive communications from the control unit 122 through the communications circuit 132 using conventional techniques.

The field device 102 includes a housing 144 that encloses and protects the electronics 121 of the field device 102 from environmental conditions, as indicated in FIG. 4. The housing 144 includes a base 146 that may be mounted to the adapter 103 or the manifold 104 using bolts 148, as indicated in FIGS. 3 and 4, respectively.

Figure 8:
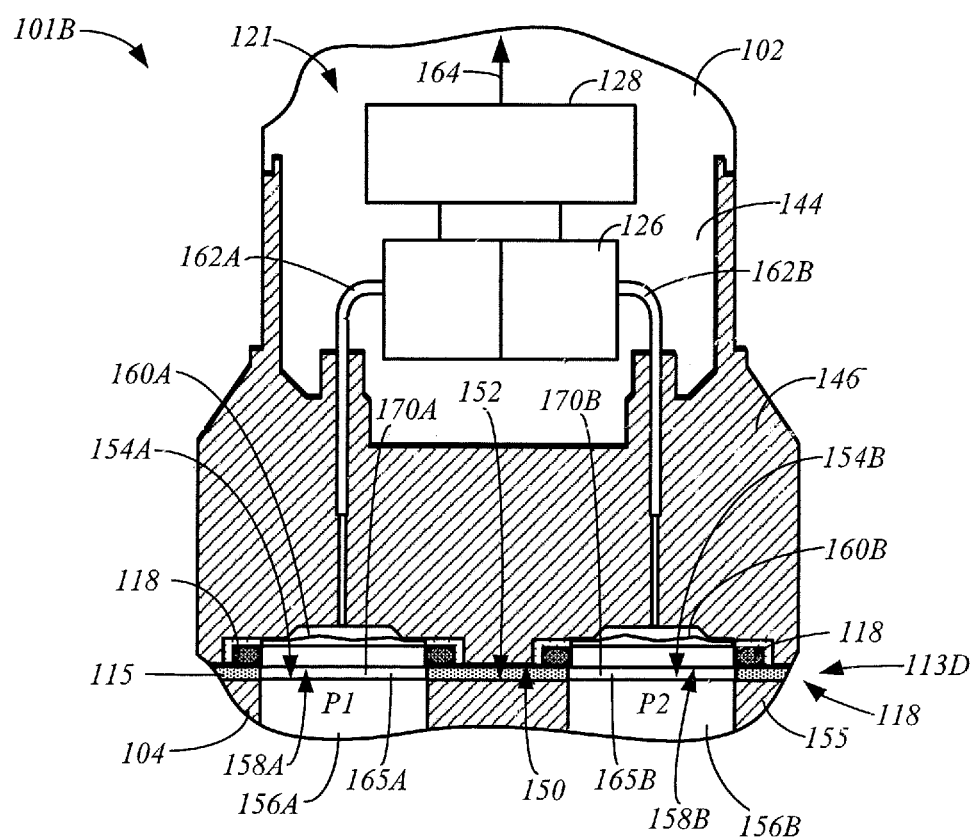
FIG. 8 is a simplified cross-sectional view of a portion of the assembly of FIG. 5 taken generally along line 8-8, in accordance with embodiments of the present disclosure.

FIG. 8 is a simplified cross-sectional view of a portion of the assembly 101B taken generally along line 8-8 of FIG. 5, when the assembly 101B is assembled (FIG. 4). In some embodiments, the interface 113D between the field device 102 and the manifold 104 is formed between a base surface or interface 150 of the base 146 and a flange surface or interface 152 (e.g., coplanar interface) of a flange 155 of the manifold 104. The interface 152 includes one or more manifold process openings 154, such as manifold process openings 154A and 154B, that are each aligned in a plane of the flange 155 of the manifold 104.

While the coplanar interface 152 is illustrated as being formed on the flange 155 of the manifold 104, it is understood that embodiments of the field device assembly 101 may utilize any suitable flange having an interface 152 in place of the depicted manifold 104, such as a flange of the adapter 103, a traditional flange, a coplanar flange, a German Institute for Standardization (DIN) flange, or other flange. Accordingly, in some embodiments, the flange 155 represents these flanges and is not limited to a flange of the manifold 104. Thus, embodiments of the field device assembly 101, to which embodiments of the present disclosure pertain, include a combination of the field device 102, a flange 155 having an interface 152 (e.g., flange interface) and one or more openings 154, for example.

In some embodiments, the openings 154A and 154B open to corresponding fluid passageways 156 of the manifold 104 (i.e., flange 155), such a fluid passageways 156A and 156B, as shown in FIG. 8. The fluid passageways 156A and 156B may be coupled to the process 108 through a suitable process interface 106, such as shown in FIG. 4. The manifold interface 152 may be substantially flat.

The base interface 150 includes one or more base process openings 158, such as base process openings 158A and 158B, that are configured to align with the corresponding manifold process openings 154A and 154B. The base process openings 158 allow the sensor or sensors 126 of the field device 102 to be exposed to the process provided by the manifold 104 through the passageways 156. The base interface 150 may be substantially flat.

The one or more manifold process openings 154 and the base process openings 158 may be used to expose a sensor 126 to process parameters of the process 108 communicated through the process interface 106. For example, the field device 102 shown in FIG. 8 is in the form of a differential pressure transmitter that includes diaphragms 160A and 160B that are respectively exposed to pressures P1 and P2 of the process 108 in the passageways 156A and 156B of the manifold 104 through the manifold process openings 154A and 154B and the base process openings 158A and 158B. The diaphragms 160A and 160B flex in response to the pressures P1 and P2. The flexing diaphragms 160A and 160B communicate the sensed pressure to the pressure sensor 126 through lines 162A and 162B, which may be filled with a hydraulic fluid. The measurement circuitry 128 may receive one or more signals from the sensor 126, and produce a differential pressure signal, which is indicated by arrow 164. The controller 124 may communicate the differential pressure measurement indicated by the signal 164 to the control unit 122 using any suitable technique, such as by adjusting the current I over the two-wire process control loop 123, as discussed above with reference to FIG. 7.

In some embodiments, a gasket 115 and, optionally, an O-ring 118 operate to form sealed passageways 165A and 165B at the interface 113D between the manifold process openings 154A and 154B and the base process openings 158A and 158B, to prevent the leakage of process fluids at the interface 113D, and to ensure that a proper process measurement (e.g., pressure measurement) may be taken.

While the exemplary field device 102 of FIGS. 3, 4 and 8 may be in the form of a differential pressure transmitter, it is understood that embodiments of the present disclosure are not limited to differential pressure transmitters. That is, embodiments of the system 120 described herein may be used with other types of field devices 102 and assemblies 101, in which the system 120 may be useful in providing dielectric insulation, such as, for example, field devices that measure a pressure, measure a temperature, measure a flow rate, measure another process parameter, and/or control a process.

Figure 9:
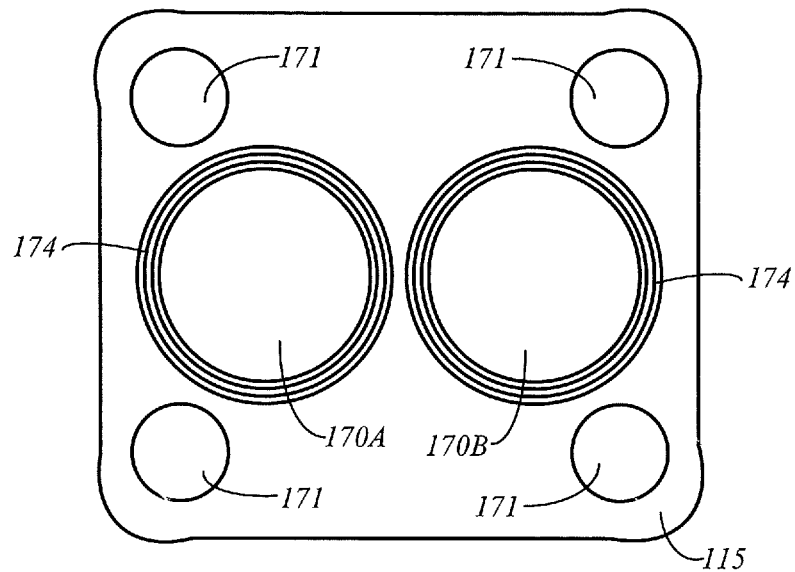
FIG. 9 is a bottom view of an example of a gasket, in accordance with embodiments of the present disclosure.
Figure 10:
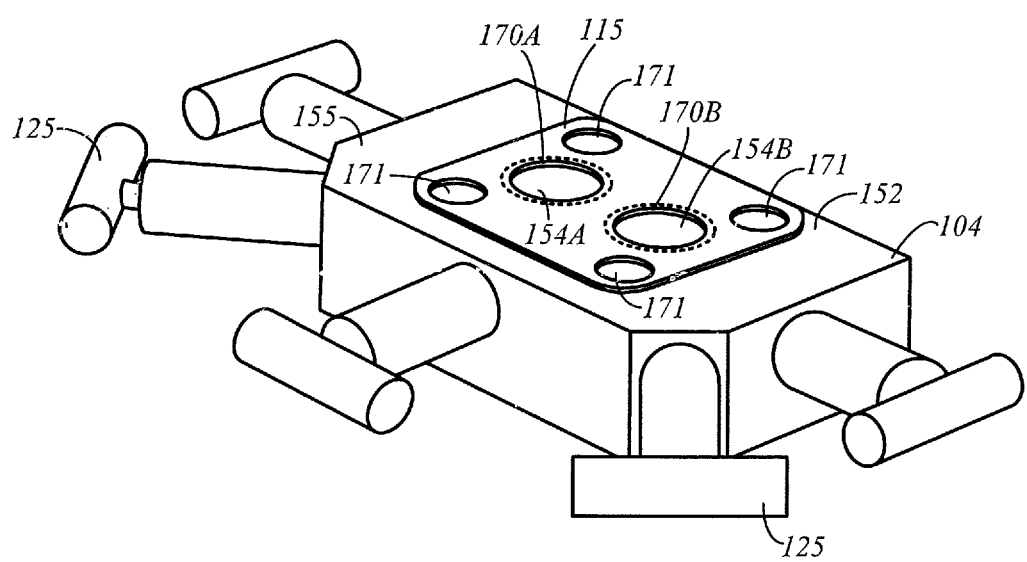
FIG. 10 is an isometric view of examples of a manifold and a gasket, in accordance with embodiments of the present disclosure.

The gasket 115 may take on any suitable form to seal the one or more passageways at the interface 113D, such as passageways 165A and 165B. FIG. 9 is a bottom view of an example of a gasket 115 that is configured to seal the passageways 165A and 165B. The gasket 115 includes one or more gasket process openings 170 that correspond to the base process openings 158 and the manifold process openings 154. For example, the gasket 115 may include gasket process openings 170A and 170B that respectively align with the corresponding base process openings 158A and 158B and the manifold process openings 154A and 154B, as illustrated in FIG. 10, which is an isometric view of an exemplary manifold 104 illustrating the alignment of the gasket openings 170 with the manifold openings 154. The gasket 115 may also include bolt openings 171, through which the bolts 148 may extend to attach the manifold 104 to the base 146. The gasket 115 is squeezed between the surfaces 150 and 152 to seal the passageways 165A and 165B and the interface 113D. The gasket 115 of FIG. 9 may include annular protuberances 174 around the openings 170A and 170B that assist in sealing the passageways 165A and 165B.

Figure 11:
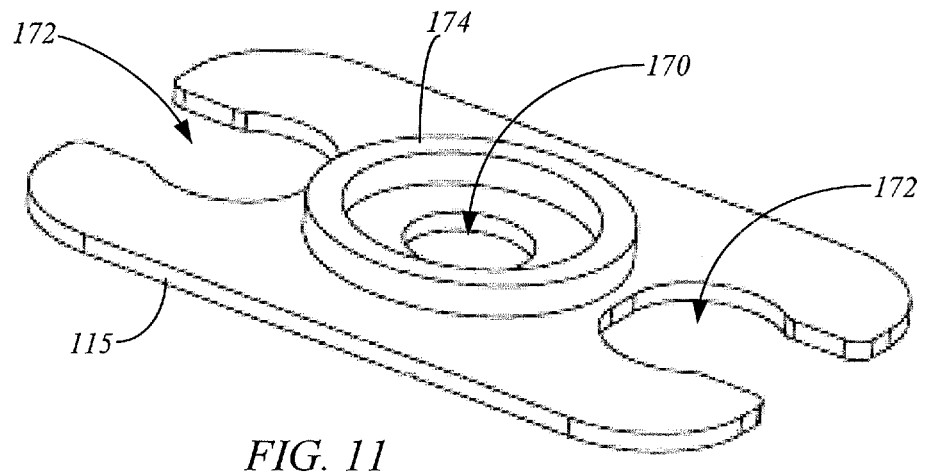
FIG. 11 is an isometric view of an example of a gasket, in accordance with embodiments of the present disclosure.

FIG. 11 is an isometric view of an example of a gasket 115 having a single gasket process opening 170 for sealing one of the passageways 165. Thus, when the field device 102 is configured to couple to two process parameters (e.g., process pressures) through separate passageways 165, one of the gaskets 115 may be used for each of the passageways 165, such as illustrated in FIG. 2 at the interface 113C. The gasket 115 may include bolt openings or cutouts 172, through which bolts connecting the manifold 104 to the base 146 may extend. In some embodiments, the gasket 115 includes an annular protuberance 174 around the opening 170 that assists in the sealing function.

Figure 12:
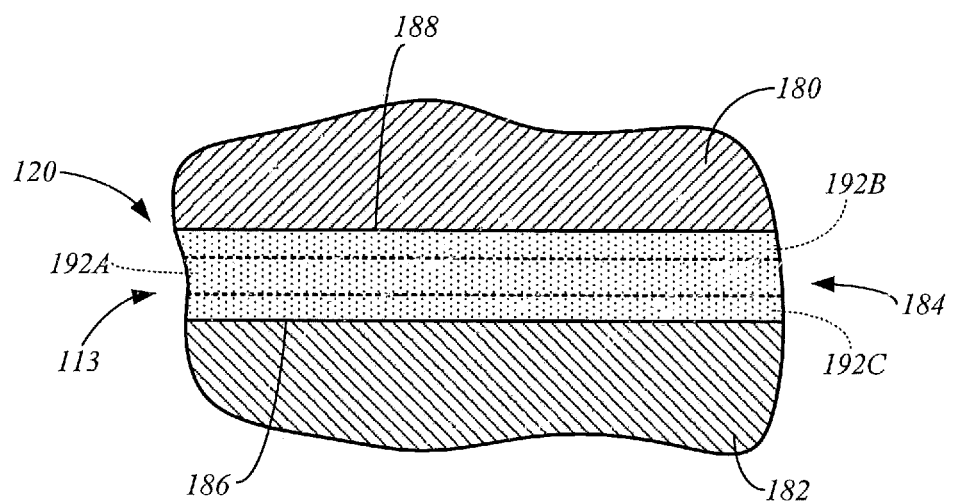
FIG. 12 is a simplified diagram of an example of an electrical insulating system at an interface of a field device assembly, in accordance with embodiments of the present disclosure.

FIG. 12 is a simplified cross-sectional view illustrating a feature of the electrical insulation system 120, in accordance with embodiments of the present disclosure at an interface 113 between metal components 180 and 182 of a field device assembly 101. The system 120 includes one or more dielectric layers 184 that operate to electrically insulate the field device 102 from the interface 106 or the process vessel 110, and protect the electronics 121 of the field device 102 from a cathodic protection scheme implemented on the process vessel 110, such as by the system 112 (FIG. 1). As a result, the system 120 eliminates electrically conductive paths between the housing 144 of the field device and the manifold 104, the adapter 103 (if present), the process interface 106 (FIGS. 3 and 4), and the process vessel 110, to protect the electronics 121 (FIG. 4) of the field device 102.

In some embodiments, the dielectric layer 184 may form a portion of the gasket 115 that seals an interface 113 between the components 180 and 182, a portion of the surface 186 of the component 180, and/or a portion of the surface 188 of the component 182. For example, the component 180 may represent the base 146 and the component 182 may represent the flange, such as the flange 155 of the manifold 104 (interface 113D), the flange of the adapter 103 (interface 113A), or another flange that is attached to the base 146. Here, embodiments of the dielectric layer 184 may include a coating or layer of the gasket 115, which operates to form a seal between the components 180 and 182 (e.g., seal the interface 113A or 113B), a coating or layer on the surface 150 of the base 146 corresponding to surface 186, and/or a coating or layer on the surface 152 of the flange of the manifold 104 or the adapter 103 corresponding to surface 188, for example.

In some embodiments, the interface 113 shown in FIG. 12 may represent an interface or junction between one of the bolts 148 with the base 146 or the manifold 104, and the insulation system 120 may form a portion of a bolt spacer 190 through which one of the bolts 148 extends, as shown in FIGS. 2 and 5. Here, the dielectric layer 184 of the bolt spacers 190 prevent electrical currents from traveling between the base 146 and the manifold 104 through the bolts 148.

Each dielectric layer 184 of the system 120 may take on various forms. In one embodiment, the dielectric layer 184 includes a layer of ceramic material. In one embodiment, the layer 184 of the ceramic material comprises alumina, which may be applied to the metal body 180 and/or 182 through chemical vapor deposition, or another suitable technique. Other examples of suitable ceramic materials that may form one of the dielectric layers 184 include nano-polymer bonded coatings such as silicon dioxide ($SiO_2$) or titanium dioxide ($TiO_2$), or spray-on coatings such as Cerakote (an epoxy-ceramic blend). In some examples, the layer 184 of ceramic material has a thickness of approximately 300 micrometers and, when the layer 184 is formed of alumina, the layer 184 should withstand approximately 2500 VDC of electricity. The thickness of the layer 184 may be increased or decreased to provide the desired electrical insulation.

In some embodiments, the layer 184 of ceramic material may be formed on the surface 186 and/or the surface 188, as indicated in FIG. 12, such as the metal surface 150 of the base 146, and/or on the metal surface 152 of the flange 155 of the manifold 104, or the flange of the adapter 103, for example. The layer 184 of ceramic material may also be applied to metal bodies forming the gasket 115 or the bolt spacers 190, as discussed below.

In some embodiments, the one or more dielectric layers 184 that form the system 120 included multiple layers 192, such as layers 192A-C, which are indicated in phantom lines in FIG. 12. For example, in some embodiments, the layer 184 comprises a layer 192A of ceramic material overmolded with a layer 192B and/or layer 192C of a plastic material, such as PEEK, Delrin® (acetal homopolymer), nylon, Santoprene™, and other thermoplastic elastomers, for example.

In yet another embodiment, the dielectric layer 184 includes an anodized layer or an anodic layer, such as that formed on anodized metal bodies or anodized coatings on metal bodies. When the metal body is aluminum, the anodized layer or anodic layer 184 should provide a voltage breakdown of approximately 900-1000 volts/mil. In some embodiments, the anodized layer or anodic layer 184 may have a thickness of approximately 0.0025 inch, which should provide insulation from approximately 2250-2500 volts.

The dielectric layer 184 may be formed by an anodized layer on the metal surface 186, which may represent the surface 150 of the base 146, and/or on the metal surface 188, which may represent the surface 152 of the flange 155 of the manifold 104, the flange of the adapter 103, or another flange that is connected to the base 146. Metal bodies forming the gasket 115 or the bolt spacers 190 may also include an anodized layer form of the dielectric layer 184, as discussed below.

Figure 13:
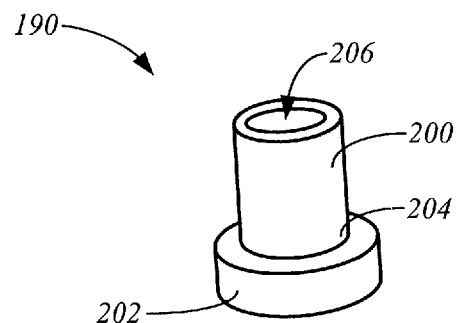
FIG. 13 is an isometric view of an example of a bolt spacer that forms a component of a dielectric insulation system, in accordance with embodiments of the present disclosure.
Figure 14:
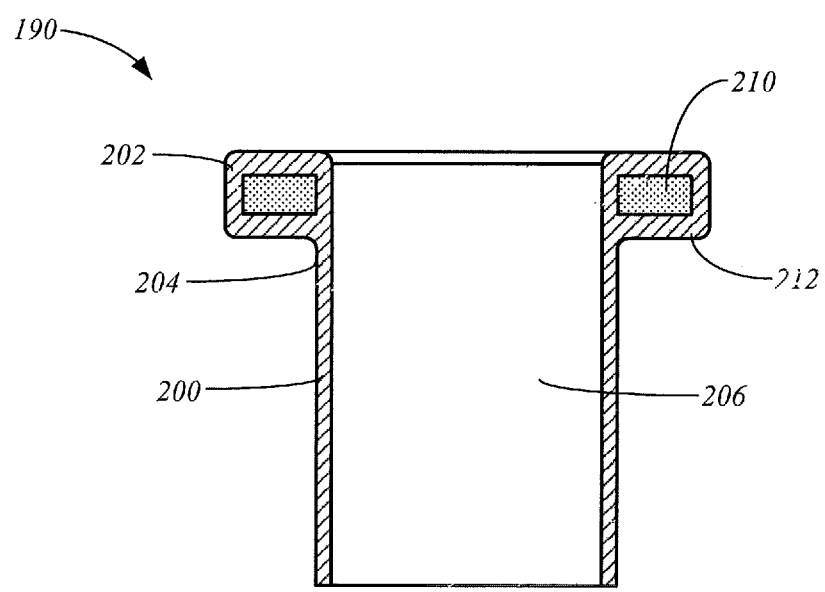
FIGS. 14 and 15 are cross-sectional views of the bolt spacer of FIG. 13, in accordance with embodiments of the present disclosure.
Figure 15:
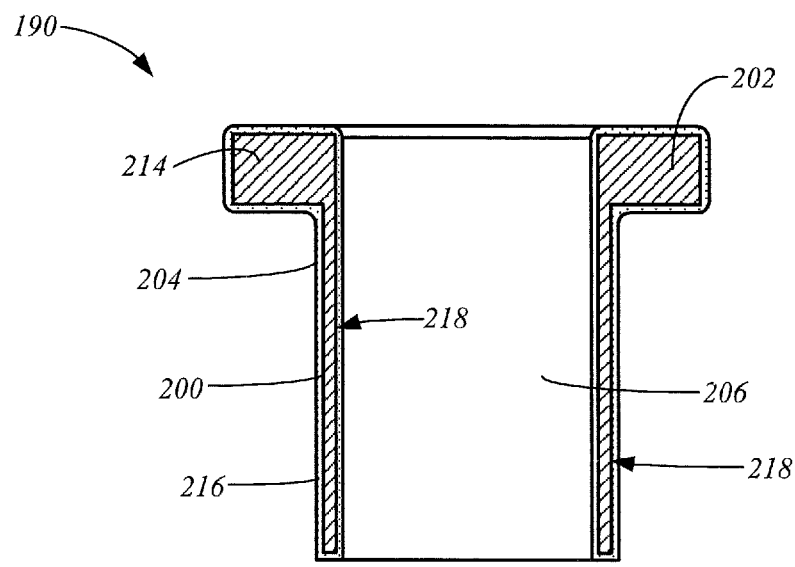

FIG. 13 is an isometric view of an example of a bolt spacer 190 that forms a component of the dielectric insulation system 120, and FIGS. 14 and 15 are cross-sectional views of the bolt spacer 190 of FIG. 13, in accordance with embodiments of the present disclosure. As shown in FIG. 13, the bolt spacer 190 may include a sleeve portion 200 and a shoulder portion 202 attached to an end 204 of the sleeve portion 200. The sleeve portion 200 is generally configured to be inserted within a bore of the base 146 or the manifold 104, and includes a bore 206, through which one of the bolts 148 may extend, as generally illustrated in FIG. 5. The shoulder portion 202 has a larger outer diameter than the sleeve portion 200 and the bore in which the sleeve portion 200 is inserted, which separates the head of the bolt 148 or the nut attached to the bolt 148 from the base 146 or the manifold 104 in which the bolt spacer 190 is inserted, and limits the distance the bolt spacer 190 may be inserted into the bore of the base 146 or the manifold 104, as shown in FIG. 4.

Conventional plastic gaskets and bolt spacers, such as those formed of polyoxymethylene (POM), which is sold under the trademark Derlin®, are subject to creep and environmental degradation. Additionally, plastic gaskets and bolt spacers have a limited pressure rating. As a result, conventional plastic gaskets and bolt spacers are generally unsuitable for high pressure applications (e.g., 6k-10k psi), and have a short lifespan requiring frequent replacement (e.g., every 3-12 months). Polyetheretherketone (PEEK) may be used as an alternative to POM, but does little to improve the issues with POM.

In one embodiment, the sleeve portion 200 and the shoulder portion 202 of each of the bolt spacers 190 of the field device assembly 101 include or are formed of a ceramic material. Thus, the bolt spacer 190 may include a ceramic body that forms the sleeve portion 200 and the shoulder portion 202. Accordingly, each bolt spacer 190 forms one of the dielectric layers 184 of the system 120. It has been determined that this embodiment of the bolt spacers 190 can handle high clamping forces upwards of 5,000 lbf, which is generally required to achieve published device working pressures for coplanar interfaces in field device assemblies. The ceramic form of the bolt spacer 190 provides advantages over bolt spacers formed of other materials, such as PEEK, such as reduced deformation under the high clamping forces.

In the embodiment shown in FIG. 14, the bolt spacer 190 includes a ring of ceramic material 210 in the shoulder portion 202 that forms the layer of ceramic material of a dielectric layer 184. In one embodiment, the ring of ceramic material 210 is overmolded with a plastic material 212. Accordingly, the ring of ceramic material 210 generally corresponds to the layer 192A, and the overmolded plastic material 212 generally corresponds to the layers 192B and 192C of the dielectric layer 184 shown in FIG. 12.

The overmolded plastic 212 may also form the sleeve portion 200, as indicated in FIG. 14. The ring of ceramic material 210 adds rigidity to the bolt spacer 190 to prevent creep while providing the electrical insulating characteristics required for dielectric insulation. The combination of ceramic and plastic materials provides the bolt spacer 190 with improved strength and electrical isolation properties over conventional single material bolt spacers, such as those formed of POM or PEEK.

Due to the dielectric insulation provided by the ring of ceramic material 210, the overmolded plastic material 212 is not constrained to low-performing plastics like PEEK or POM. Instead, the plastic overmold material 212 may comprise a soft plastic relative to PEEK or POM that provides compressive energy, such as Santoprene$^{Tm}$ or other thermoplastic elastomers.

In the embodiment shown in FIG. 15, the bolt spacer 190 comprises a metal body 214 (e.g., stainless steel) that forms the structure of the sleeve portion 200 and the shoulder portion 202, and a coating or layer 216 covering an exterior surface 218 of the metal body 214. In one embodiment, the layer 216 comprises the layer 192 of ceramic material described above, and forms one of the dielectric layers 184 of the system 120.

In another embodiment, the coating or layer 216 comprises the anodized layer discussed above, which forms one of the dielectric layers 184 of the system 120 on the bolt spacer 190.

In another example, the ring of material 210 of the example bolt spacer 190 shown in FIG. 14 is formed of a metal body, and is overmolded with the plastic 212. Similarly, the embodiment of the bolt spacer 190 shown in FIG. 15 may utilize a plastic overmold as the coating 216 on the metal body 214.

Figure 16:
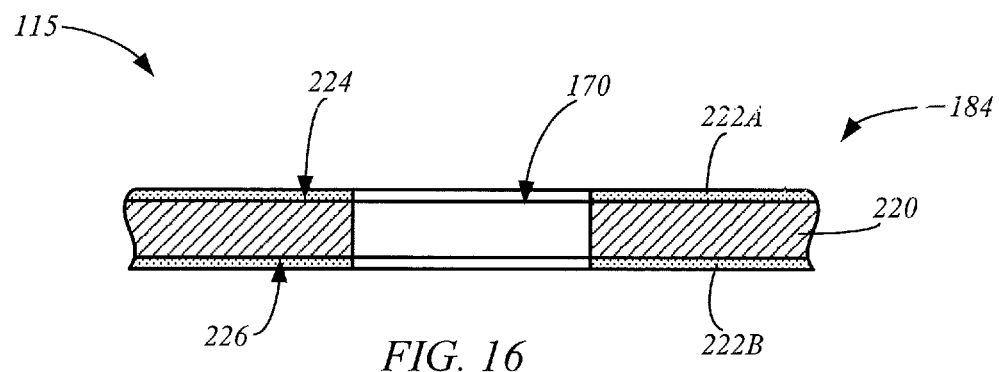
FIG. 16 is a simplified cross-sectional view of a portion of an example of a gasket of a field device assembly that forms a component of the dielectric insulation system, in accordance with embodiments of the present disclosure.

FIG. 16 is a simplified cross-sectional view of a portion of an example of a gasket 115 of a field device assembly 101 that forms a component of the dielectric insulation system 120, in accordance with embodiments of the present disclosure. The gasket 115 may be configured to seal an interface 113 of the field device assembly, such as the interface between the base 146 and a flange 155, to which the base 146 is attached, such as a flange of the manifold 104 (FIGS. 4 and 5), a flange of the adapter 103 (FIGS. 2 and 3), or another flange that is attached to the base 146. The gasket 115 includes at least one process opening 170 that is configured to align with a process opening 158 of the base 146 and a process opening of the flange 155 that is attached to the base 146, such as a process opening 154 of the manifold 104, for example. It is understood that the gasket 115 may include two process openings 170, such as illustrated by the gasket 115 of FIG. 9, a single process opening 170, such as illustrated by the gasket 115 of FIG. 11, or the gasket 115 may have another process opening configuration as dictated by the base 146 of the field device 102 and the flange 155 to which the base 146 is connected.

In some embodiments, the gasket 115 comprises a metal body 220, and at least one coating or layer 222, such as a layer 222A on a top surface 224, and/or a layer 222B on a bottom surface 226, as illustrated in FIG. 16. The layers may each form one of the dielectric layers 184 of the system 120. Accordingly, the metal body 220 may correspond to the layer 192A, the coating or layer 222A may correspond to the layer 192B, and the coating or layer 222B may correspond to the layer 192C of the dielectric layer 184 shown in FIG. 12. The metal body 220 of the gasket 115 provide improvements over their plastic counterparts, such as reduced deformation, increased longevity, as well as a higher maximum working pressure (e.g., 6092-10 k psi).

In one embodiment, each of the one or more layers 222 comprises a layer of ceramic material that forms the dielectric layer 184 of the system 120. Alternatively, each of the one or more layers 222 may comprise the anodized material or layer that forms one of the dielectric layers 184.

The embodiment of the dielectric layer 184 comprising an anodized or anodic layer on a metal body may be formed using any suitable technique. FIGS. 17-20 are simplified side cross-sectional views of an example of a technique for forming an anodized or anodic layer on a surface 230 of a metal body 232, such as the top surface 224 or the bottom surface 226 of the metal body 220 of the gasket 115 (FIG. 16), the exterior surface 218 of the metal body 214 of the bolt spacer 190 (FIG. 15), the surface 150 of the base 146 of the field device 102, the surface 152 of the flange 155 (e.g., manifold 104 or adapter 103), and/or another metal surface to form one of the dielectric layers 184 of the dielectric insulation system 120.

Figure 17:
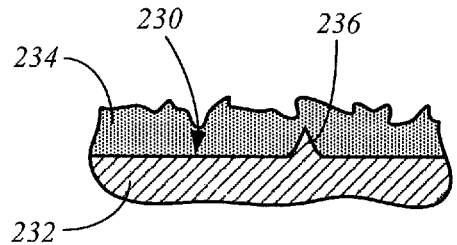
FIGS. 17-20 are simplified side cross-sectional views of an example of a technique for forming an anodized material or layer on a surface of a metal body, in accordance with embodiments of the present disclosure.
Figure 18:
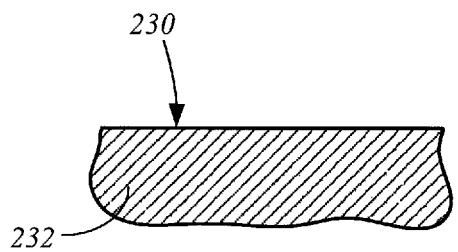

In some embodiments, the metal body 232 may comprise aluminum (e.g., 6061 aluminum) or another suitable metal. Initially, the metal body 230 may have an exterior surface 230 that is contaminated with dirt, oil or other material 234, and may include one or more imperfections 236, as indicated in FIG. 17. In one embodiment, the surface 230 is cleaned and/or polished using any suitable technique, resulting in a cleaned surface 230 as indicated in FIG. 18. For example, the contaminated surface 230 of FIG. 17 may be cleaned using an alkaline, or through another suitable technique.

Figure 19:
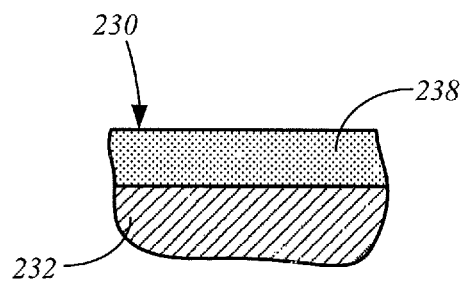

The metal body 232 may be anodized using conventional anodizing techniques, resulting in the transformation of the surface 230 into an anodic layer 238 (e.g., cellular oxide layer), as shown in FIG. 19. The anodic layer 238 may form one of the dielectric layers 184 of the system 120.

Figure 20:
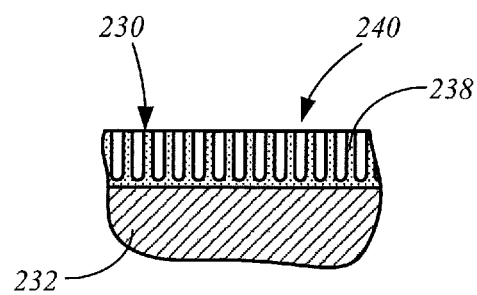

In some embodiments, the anodic layer 238 may be acid etched to provide an etched exterior surface 240, such as indicated in FIG. 20. This may provide a more uniform appearance to the surface 230, and may be used to adjust the electrical insulative properties of the anodic layer 238.

Although the embodiments of the present disclosure have been described with reference to preferred embodiments, workers skilled in the art will recognize that changes may be made in form and detail without departing from the spirit and scope of the present disclosure.

What is claimed is:

1. A field device assembly comprising:
an industrial process field device comprising:
a pressure sensor; and
a housing containing the pressure sensor and comprising a base including a base interface having a first base process opening;
a flange attached to the base of the housing and including a flange interface having a first flange process opening, wherein a pressure at the first flange process opening is communicated to the pressure sensor through the first base process opening;
a gasket including a first gasket process opening aligned with the first base process opening and the first flange process opening, a first surface engaging the base interface, and a second surface that is opposite the first surface engaging the flange interface; and
a dielectric insulation system comprising at least one dielectric layer that insulates the housing from electrical currents conducted through the flange, each of the at least one dielectric layer comprising:
a layer of ceramic material; and/or
an anodized layer,
wherein a surface of the base interface and/or a surface of the flange interface comprises a metal body having an exterior surface comprising the anodized layer, which forms one of the at least one dielectric layer.

2. The field device assembly of claim 1, wherein one of the at least one dielectric layer includes the layer of ceramic material on a metal surface.

3. The field device assembly of claim 2, wherein the gasket comprises a metal body having a ceramic coating, which forms the layer of ceramic material on a metal surface.

4. The field device assembly of claim 1, wherein one of the at least one dielectric layer includes the layer of ceramic material overmolded with a plastic material.

5. The field device assembly of claim 1, wherein one of the at least one dielectric layer comprises the anodized layer.

6. The field device assembly of claim 1, wherein the gasket comprises a metal body having an exterior surface comprising the anodized layer.

7. The field device assembly of claim 1, wherein:
the base interface includes a second base process opening;
the flange interface includes a second flange process opening;
a pressure at the second flange process opening is communicated to the pressure sensor through the second base process opening and via a second pressure sensing line;
the gasket includes a second gasket process opening aligned with the second base process opening and the second flange process opening; and
the gasket includes one of the at least one dielectric layer.

8. The field device assembly of claim 1, wherein:
the assembly includes a plurality of bolts and a plurality of bolt spacers;
each bolt extends through the base and the flange and through one of the bolt spacers, which separates the bolt from the base or the flange; and
each of the bolt spacers includes one of the at least one dielectric layer.

9. The field device assembly of claim 8, wherein each of the plurality of bolt spacers comprises a portion formed of ceramic material that forms the layer of ceramic material.

10. The field device assembly of claim 9, wherein each of the bolt spacers comprises a sleeve portion that is configured to be received within a corresponding bore of the base or the flange, and a shoulder portion attached to an end of the sleeve portion, the shoulder portion having a diameter that is larger than an exterior diameter of the sleeve portion, and including the portion formed of ceramic material.

11. The field device assembly of claim 10, wherein the portion of each of the bolt spacers formed of ceramic material is overmolded with a plastic material.

12. The field device assembly of claim 8, wherein each of the plurality of bolt spacers comprises a metal body coated with the layer of ceramic material, which forms one of the at least one dielectric layer.

13. The field device assembly of claim 8, wherein each of the plurality of bolt spacers comprises a metal body having an exterior surface comprising the anodized layer, which forms one of the at least one dielectric layer.

14. The field device assembly of claim 1, wherein a surface of the base interface and/or a surface of the flange interface comprises the layer of ceramic material, which forms one of the at least one dielectric layer.

15. A dielectric insulation system including a bolt spacer configured for insertion into a bore comprising:
  a sleeve portion;
  a shoulder portion attached to an end of the sleeve portion, the shoulder portion having a diameter that is larger than an exterior diameter of the sleeve portion; and
  a dielectric layer including one of:
    a ceramic body, wherein the sleeve portion and the shoulder portion comprise the ceramic body;
    a ceramic material overmolded with a plastic material, wherein the shoulder portion comprises the ceramic material overmolded with the plastic material;
    a metal body having an anodized exterior surface, wherein the sleeve portion and the shoulder portion comprise the metal body;
    a metal body having a ceramic coating on an exterior surface of the metal body, wherein the sleeve portion and the shoulder portion comprise the metal body;
    a metal body overmolded with a plastic material, wherein the shoulder portion comprises the metal body overmolded with the plastic material; and
    a metal body overmolded with a plastic material, wherein the sleeve portion and the shoulder portion comprise the metal body overmolded with the plastic material.

16. The system of claim 15, wherein the dielectric layer includes the ceramic body.

17. The system of claim 15, wherein the dielectric layer includes the ceramic material overmolded with a plastic material.

18. The system of claim 15, wherein the dielectric layer includes the metal body having the anodized exterior surface.

19. The system of claim 15, wherein the dielectric layer includes the metal body having the ceramic coating on the exterior surface.

20. The system of claim 15, wherein the dielectric layer includes the metal body overmolded with the plastic material.

21. A field device assembly comprising:
  an industrial process field device comprising:
    a pressure sensor; and
    a housing containing the pressure sensor and comprising a base including a base interface having a first base process opening;
  a flange attached to the base of the housing and including a flange interface having a first flange process opening, wherein a pressure at the first flange process opening is communicated to the pressure sensor through the first base process opening;
  a gasket including a first gasket process opening aligned with the first base process opening and the first flange process opening, a first surface engaging the base interface, and a second surface that is opposite the first surface engaging the flange interface; and
  a dielectric insulation system comprising at least one dielectric layer that insulates the housing from electrical currents conducted through the flange, each of the at least one dielectric layer comprising:
    a layer of ceramic material; and/or
    an anodized layer,
  wherein one of the at least one dielectric layer includes the layer of ceramic material overmolded with a plastic material.

* * * * *